US008273201B2

(12) United States Patent
Pohlmann

(10) Patent No.: US 8,273,201 B2
(45) Date of Patent: Sep. 25, 2012

(54) PROCESS FOR THE PRODUCTION OF A WOOD FIBER INSULATING MATERIAL BOARD OR MAT AND WOOD FIBER INSULATING MATERIAL BOARDS OR MATS PRODUCED BY THIS PROCESS

(75) Inventor: Cevin Marc Pohlmann, Hoisdorf (DE)

(73) Assignee: Kronotic AG, Lucerne (CH)

( * ) Notice: Subject to any disclaimer, the term of this patent is extended or adjusted under 35 U.S.C. 154(b) by 1151 days.

(21) Appl. No.: 11/314,704

(22) Filed: Dec. 21, 2005

(65) Prior Publication Data

US 2006/0143869 A1 Jul. 6, 2006

(30) Foreign Application Priority Data

Dec. 21, 2004 (DE) ......................... 10 2004 062 649

(51) Int. Cl.
*B32B 21/02* (2006.01)
*B27N 3/04* (2006.01)
*D04H 5/04* (2006.01)

(52) U.S. Cl. ...... 156/62.2; 156/62.4; 264/116; 264/121; 264/123; 264/37.28; 264/37.3

(58) Field of Classification Search ................. 156/62.2, 156/62.4; 264/116, 118, 121, 123, 37.28, 264/37.3; 442/394, 411, 416, 417
See application file for complete search history.

(56) References Cited

U.S. PATENT DOCUMENTS

| | | | | |
|---|---|---|---|---|
| 3,765,971 | A * | 10/1973 | Fleissner | 156/62.2 |
| 4,290,988 | A | 9/1981 | Nopper et al. | |
| 4,382,758 | A | 5/1983 | Nopper et al. | |
| 4,521,477 | A | 6/1985 | Kiss | |
| 4,734,236 | A * | 3/1988 | Davis | 264/112 |
| 4,802,837 | A | 2/1989 | Held | |
| 4,895,508 | A | 1/1990 | Held | |
| 4,923,656 | A | 5/1990 | Held | |
| 4,937,100 | A | 6/1990 | Lanters et al. | |
| 4,988,478 | A | 1/1991 | Held | |
| 5,417,785 | A * | 5/1995 | Baigas, Jr. | 156/62.2 |
| 5,433,905 | A | 7/1995 | Tisch | |
| 5,757,248 | A | 5/1998 | Bardal | |
| 6,100,093 | A | 8/2000 | Van Kooten et al. | |
| 6,316,075 | B1 * | 11/2001 | Desai et al. | 428/87 |
| 6,475,315 | B1 * | 11/2002 | Kean et al. | 156/62.2 |
| 6,679,694 | B1 | 1/2004 | Henschel et al. | |
| 2003/0044566 | A1 * | 3/2003 | Yang et al. | 428/74 |
| 2003/0134557 | A1 * | 7/2003 | Collison et al. | 442/356 |
| 2004/0026012 | A1 | 2/2004 | Kato et al. | |
| 2004/0192141 | A1 * | 9/2004 | Yang et al. | 442/342 |
| 2005/0214537 | A1 | 9/2005 | Pohlmann | |

FOREIGN PATENT DOCUMENTS

| | | | |
|---|---|---|---|
| AT | 204382 | | 7/1959 |
| AT | 207674 | | 2/1960 |
| AT | 409 866 | B | 12/2002 |
| AT | 411 270 | B | 11/2003 |
| CA | 2097663 | | 12/1993 |
| DE | 261529 | | 4/1968 |
| DE | 29 26 087 | | 1/1981 |
| DE | 28 45 112 | C3 | 11/1981 |
| DE | 32 33 385 | C2 | 4/1983 |
| DE | 37 28 123 | A1 | 3/1989 |
| DE | 37 36 151 | A1 | 5/1989 |
| DE | 42 18 444 | A1 | 12/1993 |
| DE | 690 14 216 | T2 | 5/1995 |
| DE | 198 46 106 | A1 | 4/2000 |
| DE | 199 16 462 | A1 | 10/2000 |
| DE | 199 61 211 | A1 | 7/2001 |
| DE | 100 56 829 | A1 | 6/2002 |
| DE | 10261569 | A1 | 7/2004 |
| DE | 10129750 | B4 | 9/2006 |
| EP | 0 383 572 | A2 | 8/1990 |
| WO | 99/22084 | | 5/1999 |
| WO | 03/021026 | A1 | 3/2003 |
| WO | 03070656 | A1 | 8/2003 |

OTHER PUBLICATIONS

"DOA Instruction handbook for non-woven apparatus 10410-2400 for non-wovens being bound by melted fibers with flame-protecting powder strewn into it" (User Manual:"DOA Betriebsanleitung für Vliesmaschine 10410-2400 für schmelzfasergebundene Vliese mit aufgestreutem Flammschutzpulver".), Dec. 10, 2001.
"Medium Density Fiberboards" ("MDF-Mitteldichte Faserplatten"), DRW Verlag, 1996.

* cited by examiner

*Primary Examiner* — Michael Tolin
(74) *Attorney, Agent, or Firm* — Laurence A. Greenberg; Werner H. Stemer; Ralph E. Locher

(57) ABSTRACT

A fiber mixture of natural fibers and binder fibers are blown from a storage container onto a first transport belt with a three-dimensional alignment of the fibers resulting in a fiber fleece. Thermally activatable synthetic resin granules are blown onto the fiber fleece and the fleece is defibered and remixed. The remixed fiber mixture is blown onto a second transport belt with a three-dimensional alignment of the fibers resulting in a mat. The thickness of the mat is obtained by the circulating speed of the second transport belt. The mat is transferred to an oven belt and is moved through a heating/cooling oven, for softening of the binder fibers and the synthetic resin granules, resulting in an intimate bonding of the wood fibers, the binder fibers, and the synthetic resin granules. The final thickness and the bulk density are set to specified ranges.

24 Claims, No Drawings

PROCESS FOR THE PRODUCTION OF A WOOD FIBER INSULATING MATERIAL BOARD OR MAT AND WOOD FIBER INSULATING MATERIAL BOARDS OR MATS PRODUCED BY THIS PROCESS

BACKGROUND OF THE INVENTION

Field of the Invention

The invention relates to a process for the production of a wood fiber insulating material board or mat and to wood fiber insulating material boards and mats produced by this process.

The production of wood fiber insulating material boards and mats is known. For example, wood fiber insulating material boards and mats are produced in the wet process. The boards and mats produced by this process are relatively thin and the expenditure during production is high; in particular high costs arise for the drying.

It is also known to produce mats by using wood fibers or other fibrous natural products in conjunction with plastic fibers. These mats are fabricated on carding machines known from the textile industry. These boards also have only a low thickness. If thicker boards are desired, then a plurality of the boards originally obtained are laid above one another in layers.

Furthermore, DE 100 56 829 discloses a process for the production of insulating material boards and mats from wood fibers and plastic fibers, in which the boards have a thickness of about 20 mm and are fabricated in one operation. In this case, the wood fibers and plastic fibers are mixed together in the desired ratio, scattered loosely in a single layer on an endless wire belt, compressed and calibrated by a second wire belt arranged above the first wire belt and subsequently consolidated in a heating unit arranged downstream.

The wood fiber insulating material boards obtained are distinguished by a layer structure, since the fibers laid above one another are aligned more or less in one direction as they are scattered onto the wire belt, as is generally known from the production process of MDF boards.

Such boards, which are used for insulation and for panel board production, have a low transverse tensile strength. The individual layers can be separated from one another without trouble in insulating boards.

In order to increase the transverse tensile strength, it is further known in board production to scatter the raw materials in a plurality of layers, the scattering direction being rotated through 90° in each case. The product obtained is then pressed. In this case, the known OSB (oriented strand board) is obtained. This product can also be obtained by the conventional procedure being applied. In this case, the mass obtained on the transport belt is pressed slightly, the product obtained is cut up into matched pieces in a further process, these are placed above one another in each case offset by 90° and finally pressed. The product obtained in this way exhibits an improved transverse tensile strength but the production is time-consuming and needs a great deal of expenditure on plant.

SUMMARY OF THE INVENTION

The invention is based on the object of providing a process for the production of wood fiber insulating material boards and mats in the dry process which makes it possible to produce single-layer wood fiber insulating material boards and mats with a wide thickness range with good transverse tensile strength and compressive rigidity and a wide density range.

According to the invention, the fibers used are aligned three-dimensionally by the process. This alignment of the fibers is maintained as far as the final consolidation. In order to carry out the process, apparatus is preferably used such as is known for the production of textile fabrics by the nonwoven process. In order to produce the wood fiber insulating material boards and mats according to the invention, the wood fibers are used with a moisture between 7 and 16%, in particular 12 and 14%.

If use is made of wood fibers which are obtained from pulped wood in a refiner, then these are previously mixed in a known manner with flame prevention and/or hydrophobicizing agents in quantities of 8 to 30%, in particular 10 to 20%, and dried to the desired dryness, dust and fibers with short lengths or diameters being removed at the same time.

The addition of the flame prevention and/or hydrophobicizing agents and the drying of the wood fibers are normally carried out separately from the production according to the invention of the wood fiber insulating material boards and mats.

The incoming bales of wood fibers and binder fibers are in each case supplied to a bale opener, in which the fibers are opened well. In addition to the wood fibers, further natural fibers, such as hemp, flax, sisal, can additionally be used to some extent instead of the wood fibers, in order to achieve specific desired properties in the wood fiber insulating material boards according to the invention. Further bale openers are then provided for these fibers.

In accordance with the desired composition, the individual components are weighed out by separate weighing devices arranged after the respective bale openers and are put into a blow line. Here, on the way from the addition of the components as far as the storage container, intensive mixing is carried out by the air blown in as a transport means. In the process, the fine plastic fibers are laid well on the wood fibers present in excess.

For the production of the wood fiber insulating material boards and mats according to the invention, the wood fibers are used in mixing ratios to binder fibers of 95 to 80 to 5 to 20% and preferably of 90 to 10%. In these material mixtures, up to 30% of the wood fibers can be replaced by other natural fibers.

The intensive mixing of the fibers is continued further in the storage container by the transport air blown in. From the storage container, after being weighed on a surface balance, the wood fiber-binder fiber mixture is blown onto a first transport belt, uniformly over its width. The quantity of fiber mixture supplied depends on the desired layer thickness and desired bulk density of the wood fiber insulating material board or mat to be produced, it being possible for the bulk densities to lie between 20 and 300 kg/m$^3$. In the preliminary fleece obtained, the alignment of the fibers is three-dimensional.

In order to improve the compressive strength, thermally activatable plastic granules can optionally be scattered onto the preliminary fleece. Well-suited to this purpose are plastic granules such as those which occur during the recycling of plastic articles from the Dual System. It is also possible to use granules which consist of a thermally resistant core and an encapsulation of plastic resins, which soften at the temperatures used in the heating zone. The plastic granules can be added in quantities of 5 to 45%, primarily in quantities of 10 to 40% and in particular in quantities of 22 to 37%, based on the fiber mixture respectively used. A powder scatterer ensures a uniform distribution of the plastic granules scattered on over the entire width of the fiber fleece moved on the first transport belt. The preliminary fleece runs into a defibering apparatus at the end of the first transport belt, mixing of the fibers used and the plastic granules possibly scattered on being carried out once more. The fiber mixture obtained is blown onto a second transport belt and ensures a three-dimensional alignment of the fibers.

By means of controlling the circulating speed of the second transport belt, the layer thickness of the endless mat obtained is adjusted. The layer thickness of the mat can be between 3 and 400 mm. If desired, woven fabrics or nonwovens of organic, inorganic or natural fibers can be laid on one or both sides of the endless mats obtained in this way. Likewise conceivable are webs of cellulose or films. The woven fabric, nonwovens or webs applied can be structured and/or perforated. Likewise, coloration is possible. Therefore, the desired properties of the wood fiber insulating material boards and mats according to the invention can be improved further.

The wood fiber insulating material boards and mats obtained in this way are then transferred from the second transport belt to an endless oven belt. The oven belt leads the mat through the heating/cooling oven. In the process, the temperatures prevailing in the heating oven soften and therefore activate the binder fibers and also the plastic granules. The temperatures in the heating oven are 130 to 200° C. and in particular 160 to 185° C. and are obtained, for example, by hot air blown in. Both the binder fibers and the plastic granules ensure an intimate connection to the wood fibers and to the woven fabric webs or films possibly laid on.

In the heating oven, a calibration zone follows the heating zone. The calibration zone is formed by pairs of rolls, in which the wood fiber insulating material boards or mats are made uniform in terms of their thickness and, if desired, are compressed to the final thickness. In this way, the wood fiber insulating material boards and mats obtained are compacted to thicknesses from 3 to 350 mm, in particular 4 to 250 mm.

Following the calibration, the mats obtained are supplied with the oven belt to a cooling zone, in which the mat is cooled with ambient air.

Coming from the oven belt, the mat is supplied to final processing to form the desired wood fiber insulating material boards or mats according to the invention. The mat is hemmed at the edges and then divided longitudinally and/or transversely.

The waste which accumulates, in particular the edge strips, is comminuted and fed back into the process. Since the desired mixture ratio is given, the material can be fed directly into the storage container.

Therefore, by the process according to the invention, wood fiber insulating material boards and mats can be produced which are characterized by a wide range of board thickness from 3 to 350 mm, in particular 4 to 250 mm, with bulk densities from 20 to 300 kg/m$^3$ and, in addition to an improved transverse tensile strength, also exhibit an increased compressive rigidity.

The invention further relates to wood fiber insulating material boards and mats corresponding to the characterizing features of claims 15 to 25. The wood fiber insulating material boards and mats according to the invention exhibit a three-dimensional alignment of the wood fibers and also the binder fibers and have layer thicknesses of 30 to 350 mm with bulk densities of 20 to 300 kg/m$^3$. The wood fiber insulating boards and mats according to the invention can be used as acoustic insulating boards, as footfall insulating mats for laminate or parquet floors, as insulating board secure against passage, as a thermal insulating composite board, as inter-rafter insulation and the like. By means of webs of nonwovens, woven fabrics and the like, made of inorganic, organic or natural fibers or films, which can be structured, perforated, colored, additionally applied to one or both sides, the range of uses of the wood fiber insulating material boards and mats according to the invention is increased further. The invention is to be explained in more detail below by using examples.

DESCRIPTION OF THE PREFERRED EMBODIMENTS

Example 1

For the production of a wood fiber insulating material board, 10 parts of binder fibers are mixed with 90 parts of wood fibers, which have previously been provided with flame prevention agents, and, via a storage container, are blown uniformly onto a first transport belt after being weighed, so that the bulk density is 30 to 60 kg/m$^3$, in particular 35 to 45 kg/m$^3$. At the end of the first transport belt, the preliminary fleece is defibered and, after loosening, is blown onto a second transport belt with a thickness between 60 and 250 mm, and the endless mat obtained in this way is transferred onto the oven belt. After the heating zone, the mat is brought into the cooling zone without great compaction but only evening out and, after that, is divided to the desired dimensions.

Example 2

For the production of a wood fiber insulating material board as an acoustic board, as described in example 1, the material is blown onto the second transport belt and, after building up the desired layer thickness, is covered on one side with a perforated fiber nonwoven in strip form. In the heating oven, the binder fibers ensure the connection of the wood fibers and attachment of the nonwoven layer to the wood fiber insulating material board formed.

Example 3

For the production of absorbers or resonators, 88 parts of wood fibers are mixed with 12 parts of binder fibers and blown out of the storage container onto a first transport belt in quantities such that a bulk density of 35 to 100 kg/m$^3$ is achieved in the mat. Following comminution of the preliminary fleece obtained at the end of the transport belt 1, the material is blown onto a second transport belt in thicknesses between 30 and 120 mm. The mat obtained is treated further as described in example 1.

Example 4

For the production of wood fiber insulating materials for use in acoustics, 10 parts of binder fibers are mixed with 75 parts of wood fibers and 15 parts of flax fibers and, via a storage container, are blown uniformly onto a first transport belt, in order that an end product having a bulk density of 35 to 130 kg/m$^3$ is obtained. With comminution of the preliminary fleece at the end of the first transport belt and thorough mixing once more, the material of the preliminary fleece is blown onto the second transport belt to give a layer thickness of 4 to 200 mm. The endless mat obtained is treated further as described in example 1.

Example 5

For the production of a wood fiber/hemp fiber insulating material board, 12 parts of binder fibers, 60 parts of wood fibers and 28 parts of hemp fibers are mixed together. The material is blown uniformly out of the storage container onto a first transport belt in such quantities that bulk densities of 25 to 50 kg/m$^3$, in particular 25 to 40 kg/m$^3$, are obtained. With the mixing of the components of the preliminary fleece from the first transport belt once more, the mass is blown uniformly onto a second transport belt. In this case, the speed of the second transport belt is adjusted such that mat thicknesses of 80 to 250 mm are obtained. The further processing is carried out in the manner described in example 1.

All the wood fiber insulating material boards and mats obtained in the abovementioned examples exhibit a higher transverse tensile strength than the previously known wood fiber insulating material boards and mats used for the same purposes.

Example 6

For the production of wood fiber insulating material mats as footfall mats in laminate or parquet floors, 11 parts of binder fibers are mixed with 89 parts of wood fibers and supplied to the storage container. From the latter, the fiber mixture is blown onto a first transport belt to form a uniform fleece which has a bulk density of 150 to 280 kg/m$^3$, in particular 150 to 180 kg/m$^3$. Before the fibers are mixed once more at the end of the first transport belt, by means of a powder scatterer arranged over the entire width of the first transport belt, plastic granules, such as accumulate during the recycling of synthetic resin products from the Dual System, are applied in quantities such that, in the fleece obtained on the second transport belt, a quantity ratio of wood fibers to binder fibers to synthetic resin granules of 55:7:38 is provided. The mat thickness on the second transport belt is 5 to 10 nm. The endless mat obtained from the second transport belt is transferred to the oven belt, heated to 170 to 180° C. with hot air in the heating zone and then drawn through the calibration zone. Here, slight compaction is carried out to the final mat thickness of 3 to 8 mm. These mats exhibit an improved compressive rigidity, in addition to good transverse tensile strength.

Example 7

8 parts of binder fiber are well mixed with 75 parts of wood fibers and 17 parts of hemp fibers and supplied to the storage container. From the latter, the fiber mixture is blown uniformly onto a first transport belt, so that a fiber fleece with a bulk density of 150 to 220 kg/m$^3$ and in particular of 150 to 180 kg/m$^3$ is produced. Following the formation of the fiber fleece, granules are added by the powder scatterer which consists of a thermally resistant core and an encapsulation of synthetic resins which soften at the temperature prevailing in the heating zone. The quantity of granules added is so high that some granules are present in two parts of the fiber mixture. The fiber mixture is mixed well with the granules by being torn up at the end of the first transport belt and is blown onto the second transport belt. In this case, the circulation speed of the second transport belt is adjusted such that an endless mat having a thickness of 20 to 22 mm is produced. A profiled woven fleece of cellulose fibers is laid over the entire mat width on one side. The product obtained in this way is transferred on to the oven belt and heated to 170° C. At this temperature, the product is moved through the calibration rolls and compacted to the final thickness of 8 to 15 mm. The wood fiber insulating material boards obtained are primarily suitable as underlay boards in dry construction.

Example 8

For the production of wood fiber insulating material boards which, for example, can be used as above-rafter insulation and can be walked on but are not absolutely secure against passage, 11 parts of binder fibers are mixed with 89 parts of wood fibers and supplied to the storage container. From the storage container, the fiber mixture is blown onto a first transport belt in quantities such that end products have a bulk density of 70 to 150 kg/m$^3$ and in particular of 100 to 140 kg/m$^3$. Via a powder scatterer, granules are added to the preliminary fleece obtained in this way, which consist of a heat-resistant core and an encapsulation that softens in the heating zone and/or consist of synthetic resin granules which are obtained during the recycling of plastic objects from the Dual System. The quantity of granules added is 28 parts of granules to 72 parts of the fiber mixture.

The preliminary fleece with the granules scattered on is comminuted and, well mixed, is blown onto the second transport belt. In this case, the speed of the second transport belt is adjusted such that the endless mat produced has a thickness of 65 to 180 mm. In a particular configuration of this example, the mat can be provided on one side with a dense, moisture-repellant film and on the other side with a woven fleece.

The mat prepared in this way and coated on both sides is led from the second transport belt onto the oven belt, heated to 175° C. in the heating zone and compacted in the calibration zone to a final thickness of 60 to 160 mm.

In the heating and calibration zone, as a result of the softening binder fibers and the granules, a good matrix is formed, in which the wood fibers are embedded and which ensure adequate attachment of the film or woven fleece applied.

Example 9

For the production of WDVS (thermal insulation composite system) loadbearing boards, 12 parts of binder fibers are mixed with 88 parts of wood fibers and supplied to a storage container. Operations are carried out as described in example 8, with the difference that a bulk density of 80 to 140 kg/m$^3$ and in particular of 95 to 105 kg/m$^3$ is achieved and the granules are added in quantities of 37 parts to 63 parts of fiber mixture. Following the intimate mixing of the fiber mixture with the granules at the end of the first transport belt, the mixture is blown onto a second transport belt. In this case, the speed of the second transport belt is set such that an endless mat having a thickness of 75 to 280 mm is produced. Following the transfer to the oven belt, heating to 175° C. takes place and compaction to a final thickness of 60 to 200 mm by the calibration rolls. The boards obtained exhibit an excellent compressive rigidity and a very good transverse tensile strength.

Example 10

For the production of wood fiber insulating material boards that are secure against passage, 13 parts of binder fibers are mixed with 78 parts of wood fibers and 9 parts of flax fibers and supplied to a storage container. From the storage container, the fiber mixture is blown onto the first transport belt, specifically in quantities which result in a board having a bulk density of 170 to 270 kg/m$^3$ and in particular of 230 to 250 kg/m$^3$. Granules obtained by recycling plastic objects from the Dual System are scattered on to the fleece formed on the first transport belt, specifically in quantities of 36 parts of granules to 64 parts of fiber mixture.

For the purpose of uniform distribution of the granules in the fiber mixture, the fleece is torn up at the end of the first transport belt; the material is mixed well and then blown onto a second transport belt. In this case, the circulation speed of the second transport belt is set such that an endless mat having a thickness of 25 to 90 mm is obtained.

A structured fiber nonwoven, preferably a random fiber nonwoven, is laid onto this mat on one side, over the entire width of the endless mat.

The product obtained in this way is transferred onto the oven belt and heated to 175 to 185° C. in the heating zone. In the calibration zone, it is compacted to a thickness of 15 to 60 mm and then cooled. The three-dimensional arrangement of the fibers is also maintained after the calibration. The mats obtained exhibit a high compressive rigidity associated with an increased transverse tensile strength.

I claim:

1. A process for producing wood fiber insulating material boards and mats, which comprises the steps of:
- introducing natural fibers and binder fibers from bale openers uniformly through separate weighing devices disposed downstream of the bale openers into a blow line in a desired mixing ratio and supplied pneumatically through the blow line to a storage container resulting in a fiber mixture, wherein the natural fibers include wood fibers;
- blowing the fiber mixture from the storage container onto a first transport belt with a three-dimensional alignment of the fibers resulting in a fiber fleece;
- scattering thermally activatable synthetic resin granules, obtained during a recycling of plastic parts, onto the fiber fleece and being distributed uniformly over an entire width;
- defibering the fiber fleece at an end of the first transport belt;
- remixing the fiber fleece once again resulting in a remixed fiber mixture;
- blowing the remixed fiber mixture onto a second transport belt with a three-dimensional alignment of the fibers resulting in a mat;
- obtaining a given thickness of the mat by setting a circulating speed of the second transport belt;
- transferring the mat to an oven belt and moving the mat through a heating/cooling oven, for softening of the binder fibers and the synthetic resin granules, resulting in an intimate bonding of the wood fibers, the binder fibers, and the synthetic resin granules; and
- setting a final thickness of the wood fiber insulating material boards or mats to a range of 3 to 350 mm by calibration and/or compaction and setting a bulk density of the mat to a range of 20 to 300 kg/m$^3$.

2. The process according to claim 1, which further comprises setting a ratio of the binder fibers to the natural fibers to lie in the range of from 5/95 to 20/80.

3. The process according to claim 1, which further comprises:
- in addition to the wood fibers, selecting the natural fibers from the group consisting of flax, hemp, and sisal; and
- supplying the natural fibers to the blow line via separate bale openers with a weighing device disposed downstream.

4. The process according to claim 1, which further comprises:
- providing the wood fibers and other natural fibers as the natural fibers; and
- providing the other natural fibers to constitute up to 30% of the natural fibers.

5. The process according to claim 1, wherein the thermally activatable synthetic resin granules forming 5 to 45% the fiber mixture.

6. The process according to claim 1, which further comprises setting the final thickness of the mat being an endless mat on the second transport belt to lie between 3 and 350 mm.

7. The process according to claim 1, which further comprises setting a heating zone in the heating/cooling oven to have a temperature of 130 to 200° C.

8. The process according to claim 1, which further comprises:
- immediately after heating of the mat in the heating/cooling oven, carrying out the calibration and/or compaction to the final thickness; and
- subsequently cooling the mat.

9. The process according to claim 1, which further comprises:
- comminuting waste accumulating during seaming and dividing up of the mat to desired final dimensions; and
- depositing comminuted waste in a storage container.

10. The process according to claim 1, which further comprises setting the final thickness to a range of 4 to 250 mm.

11. The process according to claim 1, which further comprises using wood fibers for all of the natural fibers.

12. The process according to claim 1, which further comprises setting the ratio of the binder fibers to the natural fibers to be 10/90.

13. The process according to claim 1, which further comprises:
- providing the wood fibers and flax fibers as the natural fibers;
- setting the final thickness to a range of 80 to 250 mm; and
- setting a bulk density of the mat to a range of 25 to 50 kg/m$^3$.

14. The process according to claim 1, which further comprises:
- setting the final thickness to a range of 3 to 8 mm;
- setting the bulk density of the mat to a range of 150 to 280 kg/m$^3$;
- adding a proportion of synthetic resin granules to the fiber fleece;
- slightly compacting the mat in the heating/cooling oven; and
- forming the mat as a wood fiber insulating mat for parquet or laminated floors.

15. The process according to claim 1, which further comprises:
- setting the final thickness to a range of 8 to 15 mm;
- setting a bulk density of the mat to a range of 130 to 220 kg/m$^3$;
- adding a proportion of synthetic resin granules to the fiber fleece;
- providing a profiled woven fabric fleece as the layering material applied to one side of the mat obtained on the second transport belt;
- forming the mat as a wood fiber insulating material board for use as an underlay board in dry construction; and
- compacting the mat in the heating/cooling oven.

16. The process according to claim 1, which further comprises:
- forming the mat as a wood fiber above-rafter insulating board;
- setting the final thickness to a range of 60 to 160 mm;
- setting a bulk density of the mat to a range of 70 to 150 kg/m$^3$;
- adding a proportion of synthetic resin granules to the fiber fleece; and
- compacting the mat in the heating/cooling oven.

17. The process according to claim 1, which further comprises:

forming the mat as a wood fiber above-rafter insulating board;

setting the final thickness to a range of 60 to 160 mm;

setting a bulk density of the mat to a range of 70 to 150 kg/$m^3$;

adding a proportion of synthetic resin granules to the fiber fleece;

providing the layering material as a moisture-repellent film laid on a first side of the mat formed on the second transport belt and a woven fleece laid on a second side; and compacting the mat in the heating/cooling oven with simultaneous joining of the film or the woven fleece applied.

18. The process according to claim 1, which further comprises:

forming the mat as a wood fiber thermal insulation composite system load-bearing board;

setting the final thickness to a range of 60 to 200 mm;

setting a bulk density of the mat to range of 80 to 150 kg/$m^3$;

adding a proportion of synthetic resin granules to the fiber fleece; and forcibly compacting the mat being an endless mat in the heating/cooling oven.

19. The process according to claim 1, forming the mat to be a wood fiber insulating board secure against passage;

setting the final thickness to a range of 15 to 60 mm;

setting a bulk density of the mat to a range of 170 to 270 kg/$m^3$;

adding a proportion of synthetic resin granules to the fiber fleece; and very forcibly compacting the mat being an endless mat in the heating/cooling oven.

20. The process according to claim 1, which further comprises:

forming the mat as a wood fiber insulating board secure against passage;

setting the final thickness to a range of 15 to 60 mm;

setting a bulk density of the mat to a range of 170 to 270 kg/$m^3$;

adding a high proportion of synthetic resin granules to the fiber fleece;

applying the layering material as a structured fiber nonwoven to one side of the mat being an endless mat; and very forcibly compacting the endless mat in the heating/cooling oven.

21. The process according to claim 1, which further comprises laying a layering material selected from the group consisting of fiber nonwovens, woven fiber fabrics and films on at least one or both sides of the mat.

22. The process according to claim 21, which further comprises forming the fiber nonwovens or the woven fiber fabrics laid on one or both sides from organic fibers, inorganic fibers or natural fibers.

23. The process according to claim 21, which further comprises forming the films from cellulose or plastic.

24. The process according to claim 21, which further comprises forming the fiber nonwovens, the woven fiber fabrics or the films to be at least one of structured, perforated and colored.

* * * * *